June 27, 1967 T. P. COTE ET AL 3,327,803
INDEPENDENT REAR WHEEL SUSPENSION
Filed Dec. 22, 1964 2 Sheets-Sheet 2
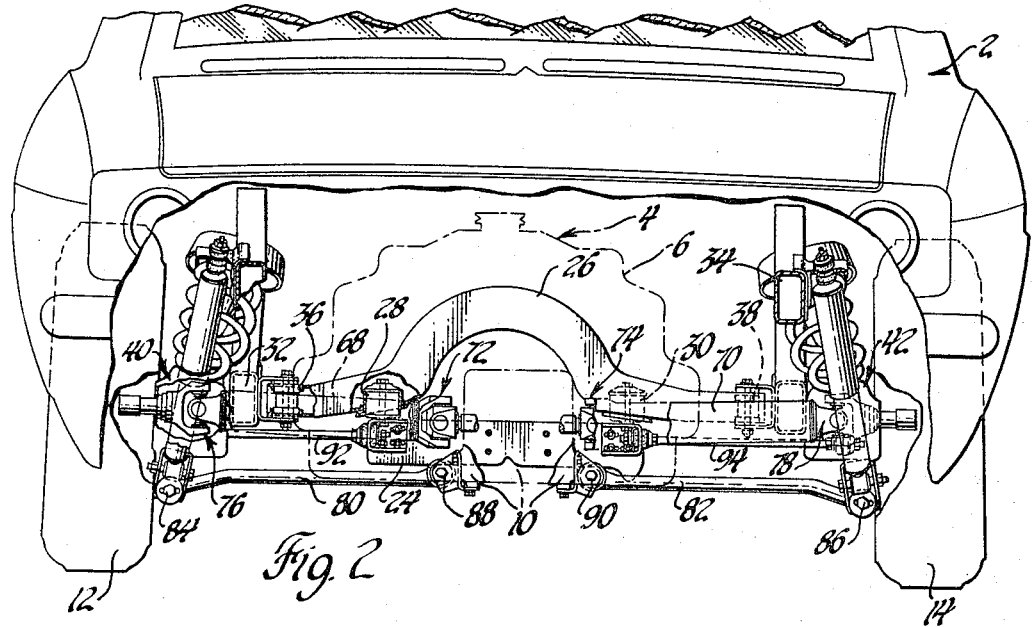
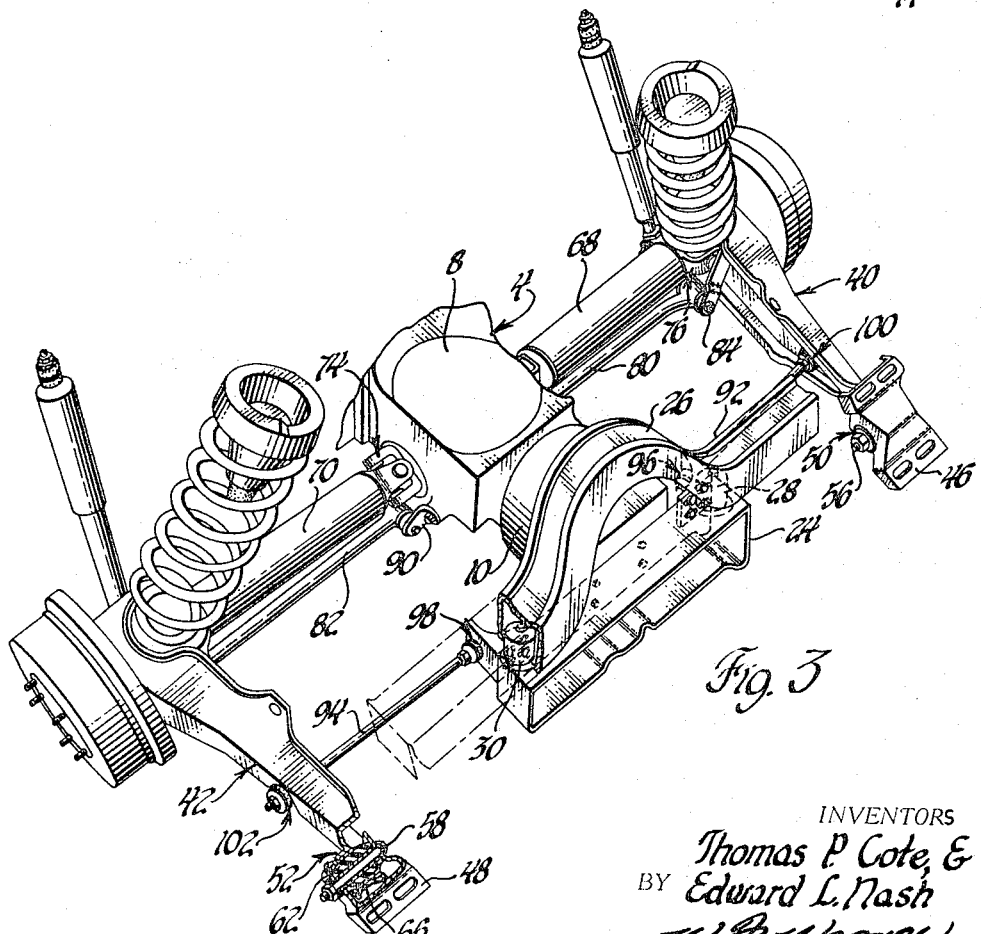
INVENTORS
Thomas P. Cote, &
BY Edward L. Nash
W. P. Wagner
ATTORNEY

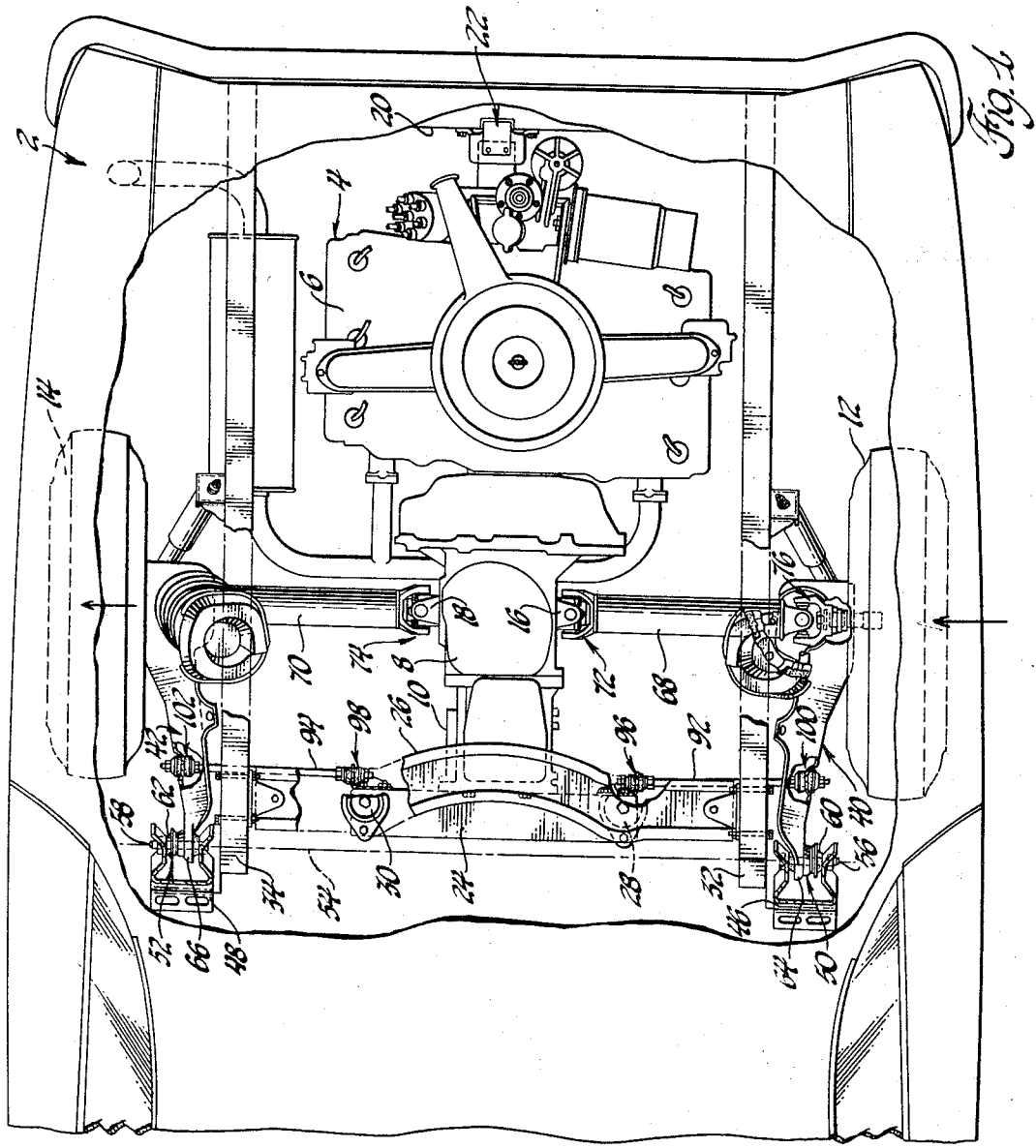

United States Patent Office 3,327,803
Patented June 27, 1967

3,327,803
INDEPENDENT REAR WHEEL SUSPENSION
Thomas P. Cote, Warren, and Edward L. Nash, Farmington, Mich., assignors to General Motors Corporation, Detroit, Mich., a corporation of Delaware
Filed Dec. 22, 1964, Ser. No. 420,268
8 Claims. (Cl. 180—73)

This invention relates to vehicle suspension and more particularly to swing axle suspension for a vehicle having a rear mounted driving aggregate.

As used herein, the expression "driving aggregate" denotes a unitary or coupled assembly of a power plant, transmission and differential.

Among the numerous prior art swing axle suspensions is a type in which each of the traction wheels is supported and guided by a trailing torque arm and a pair of vertically spaced transverse links. This type of suspension has proved superior to others in providing accurate roll steer characteristics and minimal camber change during wheel deflection with correspondingly reduced track variation. In addition, a construction of this type enables significant lowering of the rear roll center and roll axis with attendant improvement in vehicle stability.

While the suspension referred to above possesses the several salutary characteristics noted, application thereof to vehicles incorporating rear mounted driving aggregates is frustrated by the fact that the normal elastic mounting of the driving aggregate negatively affects the desirable geometry obtained therefrom.

The present invention is directed toward achieving a suspension construction which beneficially utilizes the elastic deflection characteristics of the driving aggregate mounting rather than being adversely affected thereby as would normally be the case.

An object of the present invention is to provide an improved swing axle suspension.

Another object is to provide an improved swing axle suspension for vehicles utilizing rear mounted driving aggregates.

A further object is to provide in a vehicle having an elastically mounted driving aggregate, a suspension arrangement which is constructed and arranged with reference thereto so that vehicle side loads generated in cornering induces yawing of the driving aggregate relative to the vehicle which in turn is kinematically transferred to the suspension structure in such a way as to induce angular change of the plane of driving wheels in an understeer direction.

Still another object of the invention is to provide an arrangement of the stated character wherein both the driving aggregate and the suspension structure are sufficiently elastically isolated from the sprung mass of the vehicle as to achieve optimum freedom from objectionable noise transmission.

These and other objects, advantages and features of the invention will become more readily apparent as reference is had to the accompanying specification and drawings wherein:

FIGURE 1 is a plan view, partly in section, of the rear portion of a vehicle incorporating a suspension and driving aggregate in accordance with the invention;

FIGURE 2 is a rear end elevational view of the construction shown in FIGURE 1; and FIGURE 3 is a perspective view showing the major components and arrangement thereof of the suspension depicted in the preceding figure.

Referring now to the drawings and particularly FIGURES 1 and 2, there is shown a vehicle 2 of the integral body frame type which incorporates a unitary driving aggregate 4 comprising a rearwardly located power plant 6, an intermediately located differential 8, and a forwardly located transmission 10. Driving aggregate 4 extends longitudinally of the vehicle laterally midway between a pair of traction wheels 12 and 14, the axis of rotation of which is collinear with the axis of rotation of laterally oppositely extending differential output members 16 and 18.

The rearward end of driving aggregate 4 is elastically mounted on a transverse structural member 20 of vehicle 2 by means of a single rubber mount assembly 22 which exhibits a relatively high spring rate in lateral deflection. The forward end of driving aggregate 4 in turn is rigidly connected to a short transverse beam 24, the lateral opposite ends of which are suspended from a box-section transverse carrier 26 by means of rubber mounts 28 and 30, the combined lateral deflection rate of which is significantly lower than the corresponding rate of mount 22. The opposite ends of carrier 26 in turn are mounted on vehicle side rails 32 and 34 by rubber mounts 36 and 38. When so mounted, it will be evident that driving aggregate 4 in addition to being adequately elastically isolated from the vehicle superstructure is also susceptible to significant lateral deflection in a horizontal plane about an imaginary point located in the vicinity of rubber mount 22, a condition which is herein referred to as "yawing."

In order to rotatably support and guide the deflection path of the wheels relative to the vehicle, in accordance with one feature of the invention, traction wheels 12 and 14 are rotatably mounted on the rearward ends of trailing torque arms 40 and 42, respectively, the forward ends of which are pivotally connected to brackets 46 and 48 on the vehicle superstructure by rubber bushed pin joints 50 and 52 which define a common transverse axis 54 located forwardly of the forward end of driving aggregate 4. As seen best in FIGURES 1 and 3, pin joints 50 and 52 include center bolts 56 and 58 which extend through metal sleeved annular rubber bushings 60 and 62 press fitted into the eyes 64 and 66 of arms 40 and 42. The bushings 60 and 62 are fashioned to permit substantial lateral deflection in either direction so as to enable the forward ends of arms 40 and 42 to deflect laterally along the axis of the center bolts 56 and 58, the purpose of which will be described shortly.

As seen best in FIGURE 2, wheels 12 and 14 are operatively connected to differential output members 16 and 18 by half axles 68 and 70 by inboard universal joints 72 and 74 and outboard universal joints 76 and 78. Disposed vertically beneath axles 68 and 70 are a pair of transversely oppositely extending links 80 and 82 which are pivotally connected at their outboard ends to the rearward ends of trailing links 40 and 42 by pin joints 84 and 86 and at their inboard ends to differential portion 8 by pin joints 88 and 90. As will be evident from FIGURES 2 and 3, half axles 68 and 70 and links 80 and 82 form articulated parallelogram linkages which in association with trailing arms 40 and 42 control the alignment and deflection path of the wheels 12 and 14. It will, of course, be apparent that half axles 68 and 70 in addition to the function noted also operate to impart driving forces to the wheels.

Upon examination of FIGURES 1 and 2, it will be seen that a suspension construction of the type thus far described will exhibit symmetrical geometric action under conditions of parallel ride deflection, that is, when the sprung portion of the vehicle descends in parallel relation to the road, each of the wheels 12 and 14 will exhibit a certain degree of toe-in change as a result of such deflection and a slight camber change determined by the spatial orientation of the parallelogram linkages 70, 82 and 68, 80. However, under conditions of roll deflection, i.e., during cornering of the vehicle, centrifugal force exerted on the sprung mass induces a side load on each of the wheels 12 and 14 which is transmitted through half axles 68 and 70 and links 80 and 82 to exert a side thrust on the driving aggregate 4 forwardly of the rear engine mount 22. Since this thrust will induce lateral deflection or yawing of the driving aggregate, the normal toe-in of each driving wheel would be significantly altered in a direction resulting in oversteering action of the rear wheels. Thus, for example, if the vehicle shown in FIGURE 1 is negotiating a right turn, centrifugal force acting on the sprung mass will induce side loads on each of the rear wheels in the direction indicated by the arrows, which side loads are transmitted through the half axles and links to induce yawing action of the engine aggregate in a clockwise horizontal angular path. Since the half axles and links are connected to the driving aggregate, the wheels 12 and 14 are necessarily similarly displaced to the right relative to the vehicle superstructure. Inasmuch as the forward ends of trailing arms 40 and 42 would remain in essentially the same lateral positions relative to the superstructure, the plane of rotation of each of wheels 12 and 14 would tend to angle in a counterclockwise direction or "steer" toward the outboard side of the vehicle, thus producing an oversteer condition. It, of course, follows that the greater the centrifugal force acting on the vehicle, the greater the degree of oversteer.

According to the principal feature of the invention, the yawing effect of the engine aggregate just described is utilized so as to not only cancel the oversteering tendency but further to induce a significant degree of understeer during vehicle cornering. As seen best in FIGURE 1, a pair of transversely extending tie rods 92 and 94 are articulatably connected at their inner ends to beam 24 by opposed grommet type compression mounts 96 and 98 and at their outer ends by similar grommet type mounts 100 and 102 to trailing arms 40 and 42 at points rearwardly adjacent the forward ends thereof. When arranged in the manner shown, it will be seen that the clockwise movement of the forward end of the driving aggregate resulting from the yawing action previously described will transversely displace tie rods 92 and 94 toward the right which in turn will induce corresponding transverse movement to the forward ends of trailing arms 40 and 42. Since the transverse movement of these forward ends along the axis of center bolts 56 and 58 will be greater than the transverse movement of the rearward ends, the planes of rotation of wheels 12 and 14 will angle toward the inboard side of the turn, thus providing an understeering angle rather than an oversteering angle. Naturally, the degree of understeer thereby effected will depend upon the relative lateral stiffness of the rear mount 22 and forward mounts 28 and 30 as well as the longitudinal location of the articulatable connections for tie rods 92 and 94.

From the foregoing it will be seen that a novel and improved suspension sytem has been provided which is not only successfully combined with an elastically mounted driving aggregate, but in fact achieves superior performance as a result of the relationship established.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a motor vehicle, a unitary driving aggregate, elastic means mounting said driving aggregate on said vehicle for lateral swinging movement in a horizontal plane, a pair of driving wheels, a pair of half axles operatively connecting said wheels with said driving aggregate capable of imparting lateral swinging movement to said driving aggregate responsive to wheel side load, longitudinally extending wheel guiding means flexibly pivotally connected to said vehicle forwardly of said half axles, and transverse link means intermediate said half axles and said pivotal connections connecting the forward portions of said wheel guiding means to the forward end of said driving aggregate so that movement of the forward end of said driving aggregate induces corresponding movement in the forward ends of said wheel guiding means.

2. In a motor vehicle, a unitary driving aggregate, longitudinally spaced elastic members mounting said aggregate on said vehicle enabling lateral swinging movement of the forward end thereof relative to the rearward end, driving wheels rotatably supported on the rearward ends of laterally spaced longitudinally extending torque arms, transverse pivot means connecting the forward ends of said arms to said vehicle, said pivot means including elastic portions permitting displacement of said forward ends along the axis of said pivot means, a pair of half axles operatively connecting said wheels with said driving aggregate intermediate the length thereof capable of imparting lateral swinging movement thereto responsive to side loading of said wheels, and transverse link means connecting the forward portions of said torque arms to the forward end of said driving aggregate.

3. The structure set forth in claim 2 wherein said longitudinally spaced elastic members comprise a pair of transversely spaced mounts at the forward end of said driving aggregate and a single mount at the rearward end thereof.

4. In a motor vehicle, a pair of laterally spaced longitudinally extending torque arms pivotally connected at their forward ends to said vehicle on laterally spaced apart generally transversely extending pin joints, yieldable means enabling lateral displacement of said forward ends relative to said pin joints, a pair of road wheels rotatably mounted on the rearward ends of said arms, a driving aggregate elastically mounted on said vehicle between said wheels, lateral wheel control means including thrust transmitting half axles operatively connecting said wheels with said driving aggregate, a pair of oppositely extending tie rods connecting the forward end of said driving aggregate to said torque arms intermediate the length of the latter, and spring means disposed between each of said torque arms and said vehicle.

5. In a motor vehicle, a pair of laterally spaced longitudinally extending torque arms pivotally connected at their forward ends to said vehicle on laterally spaced apart transversely extending pin joints, yieldable means enabling lateral displacement of said forward ends relative to said pin joints, a pair of road wheels rotatably mounted on the rearward ends of said arms, a driving aggregate elastically mounted on said vehicle between said wheels, lateral wheel control means including thrust transmitting half axles operatively connecting said wheels with said driving aggregate, a pair of transversely aligned oppositely extending tie rods connecting the forward end of said driving aggregate to said torque arms intermediate the length of the latter, and spring means disposed between each of said torque arms and said vehicle.

6. In a motor vehicle, a pair of laterally spaced longitudinally extending torque arms pivotally connected at their forward ends to said vehicle on laterally spaced apart transversely extending pin joints, yieldable means enabling lateral displacement of said forward ends relative to said pin joints, a pair of road wheels rotatably mounted on the rearward ends of said arms, a driving aggregate elastically mounted on said vehicle between said wheels, lateral wheel control means including thrust transmitting half axles operatively connecting said wheels with said driving aggregate, a pair of transversely aligned oppositely extending tie rods connecting the forward end of said driving aggregate to said torque arms rearwardly adjacent the forward ends thereof, and spring means disposed between each of said torque arms and said vehicle.

7. The structure set forth in claim 6 wherein said transversely extending pin joints are collinear on an axis located forwardly of the forward end of said driving aggregate.

8. The structure set forth in claim 6 wherein said yieldable means comprises annular elastic elements surrounding said pin joints.

References Cited

UNITED STATES PATENTS

| 2,845,134 | 7/1928 | Reimspiess | 180—73 |
| 2,988,162 | 6/1961 | Hansen | 180—64 X |
| 3,147,815 | 9/1964 | Arkus-Duntov et al. | 180—73 |

FOREIGN PATENTS

| 866,811 | 5/1961 | Great Britain. |

A. HARRY LEVY, *Primary Examiner.*